Aug. 21, 1973     S. EISNER     3,753,889
VIBRATORY APPARATUS
Filed July 13, 1972     2 Sheets-Sheet 1

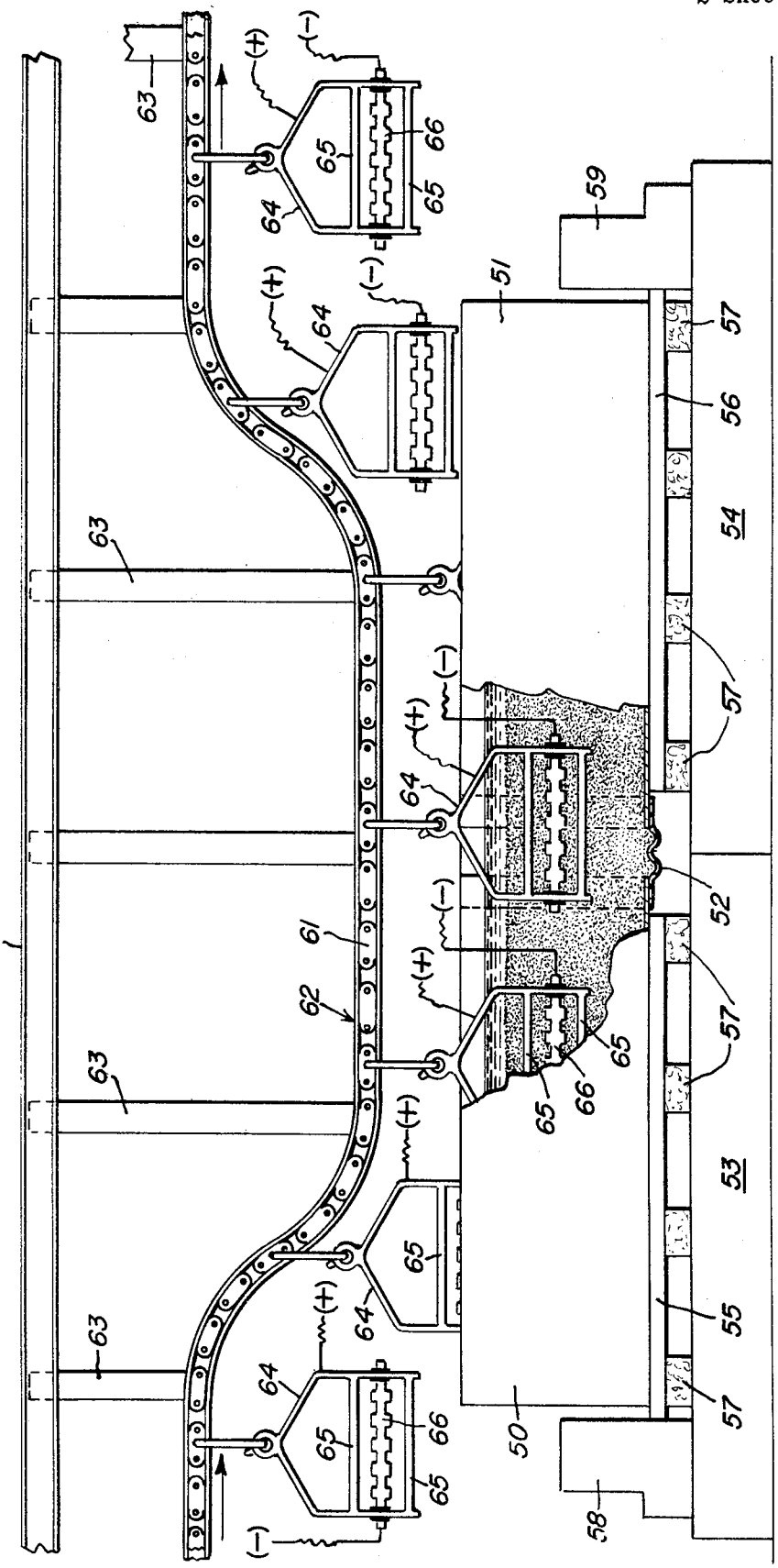

United States Patent Office

3,753,889
Patented Aug. 21, 1973

3,753,889
VIBRATORY APPARATUS
Steve Eisner, Schenectady, N.Y., assignor to
Norton Company, Troy, N.Y.
Continuation-in-part of abandoned application Ser. No. 252,881, May 12, 1972, which is a division of application Ser. No. 102,287, Dec. 29, 1970. This application July 13, 1972, Ser. No. 271,527
Int. Cl. B65g 49/02
U.S. Cl. 204—198                                5 Claims

ABSTRACT OF THE DISCLOSURE

An electrodeposition apparatus comprising a vibratory container having a generally elongate configuration, with a cross section curved on at least one side so as to produce a mass rotational movement of a mass of small particles and electrolyte positioned loosely therein when vibration is imposed upon such container, and means associated therewith to independently suspend, within the mass of particles and electrolyte in such container, at least one set of electrodes isloated from the vibration imposed upon such container except by contact with said particles and electrolyte.

FIELD OF THE INVENTION

Electrodeposition of metal on another surface through electrochemical action has generally been a slow process. Particularly, this has been true in the production of dense, smooth, compact platings from aqueous solutions containing dissolved salts of the metal to be deposited. The present invention relates to this general field of electrodeposition.

RELATED APPLICATIONS

The present case is a continuation-in-part of application Ser. No. 252,881, entitled "Vibratory Process and Apparatus," filed May 12, 1972, and now abandoned, which in turn is a divisional application of Ser. No. 102,287, filed Dec. 29, 1970 now Pat. No. 3,699,014 and entitled "Vibratory Process," all of these cases having as the inventor thereof, Steve Eisner, inventor in the present case.

DESCRIPTION OF PRIOR ART

Efforts have been made in the past to mechanically improve electrodeposited metals. The use of small amounts of impact media such as glass spheres, sand and the like, has been tried with the idea that this would mechanically beat the plate deposited and make it more dense and coherent. Examples of this approach are illustrated in U.S. Letters Patent Nos. 712,153; 1,051,556 and 1,594,509. A much more recent approach directed to the improvement of deposition rates has been the "mechanical activation" described and claimed in my earlier patent, U.S. 3,619,384, issued on Nov. 9, 1971. In that case it was found that by using a plurality of small, dynamically hard particles held in a fixed relationship to one another by a supporting media as a means of constantly activating or, if you will, irritating the surface being plated, plating speeds could be drastically increased. Further, by this "mechanical activation" it was found that plate of good brightness could be achieved without the necessity of chemical additives, although the process also operated well with such additives. One form of the activating device described in such earlier application was a plurality of small objects such as spheres or irregular shaped bodies made up of a ceramic or plastic matrix supporting many very small dynamically hard particles adhered to or protruding therefrom in spaced relationship to one another. "Activating" the surface as described in said U.S. Pat. No. 3,619,384, is described as so treating the surface being plated as to create at such surface a high tendency to utilize the current to deposit the metal in sound, adherent form rather than as powder or dendrites. The "dynamically hard" particles used to accomplish this were defined as acting to produce such "activation" through a combination of the hardness of the particles, the contact pressure of the particles on the surface of the electrodeposit and the speed at which the particles move relative to the surface of the electrodeposit during plating.

My subsequent application Ser. No. 102,287, now Pat. No. 3,699,014 describes a mechanically-activated electrodeposition process wherein a plurality of small hard particles are moved within a vibratory container so as to completely cover the surface of the electrodeposit throughout the electrodeposition reaction.

SUMMARY

The present invention relates to equipment or apparatus for a mechanically-activated plating process wherein vibratory units of particular configuration are provided with supporting means for the cathodic and anodic electrodes which are so disposed as to be essentially free from any vibratory forces transmitted by the walls of the vibratory units.

DRAWINGS

FIG. 3 illustrates a unit of the apparatus of the present invention with provision for automation of the system and the use of multiple conveyorized racks therewith.

DESCRIPTION OF PREFERRED EMBODIMENTS

Figure 1:
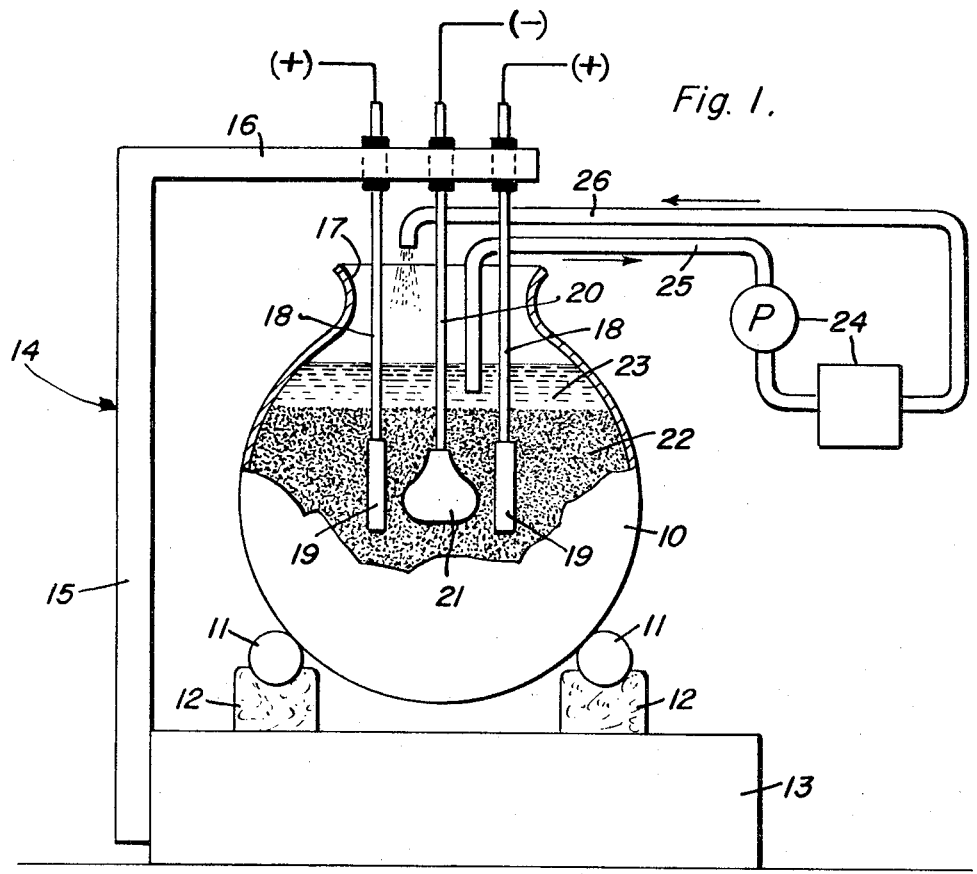
FIG. 1 is a schematic view illustrating one form of the invention with a permanent anode-cathode rack support.

The process carried out by the apparatus of the present invention requires the controlled application during plating of a plurality of small activating particles to the surface or surfaces being plated. Generally, these activating particles will be very small, i.e., having an average maximum dimension of up to about ¼" and preferably of about ⅛" or less, in order to penetrate into small radius openings on the surface to be plated. The activating particles must be preferably non-conductive and insoluble in the electrolyte. For most metals a minimum dynamic particle hardness slightly greater than the hardness of the deposited metal is necessary but since higher hardnesses do not appear to produce adverse effects, it is preferred, in order to avoid experimentation, to utilize particles having a hardness of about Knoop 500 or greater. The particles must be capable of being wet by the electrolyte with which they are used and should have a density greater than that of the electrolyte. An extremely wide variety of particulate materials may be used so long as they meet the above criteria. Suitable particles have been found to be glass, sand, abrasive grains (both natural and artificial), tumbling abrasives, ceramics and the like. These particles may be used alone or in blends of one or more kinds of particles with another kind, e.g., a particularly good blend, especially for nickel plating has been found to be a 60–40 mixture by volume of 30 mesh glass spheres and 30 mesh sintered bauxite particles.

While preferably the activating particles are all non-conductive in nature, it is possible to mix in some conductive particles if it is desired to decrease the electrical resistance between the anode and cathode. It has been found that up to about 5% by volume of all conductive particles may be used with only slight hazard of forming a conductive path between the anode and cathode. Where the conductive particles are at least partially shielded by being provided with a non-conductive coating, greater percentages can be used.

The activating particles must be subjected to a vibratory action at all times during plating and the object or surface to be plated must be completely covered by these activating particles while plating is in progress. For decorative purposes, there frequently may be present a chemical additive of the various types known to the plating art. These additives are used in the amounts recommended by the manufacturer thereof for normal plating operations.

Typical additives which may be advantageously used in the present process are thiourea and its derivatives, e.g., ethyl thiourea; thiohyantoins, e.g., 1-acetyl-2-thiohydantoin; poly-ethers; e.g., "Carbowax 6000," product of Union Carbide Corporation; organic polysulfide compounds such as those described in U.S. Pat. No. 3,328,273; aniline dyes, e.g., diethyl safranine azo dimethyl aniline and others described in U.S. Pat. No. 2,738,318; thiazine dyes, e.g., methylene green and others described in U.S. Pat. No. 2,805,193; colloidal materials such as glue or casein; thioaromatic compounds, e.g., diphenyl sulfide and others described in U.S. Pat. No. 2,424,887; chloride or bromide ions in various concentrations; ions of non-deposited metals, e.g., aluminum or magnesium in zinc plating baths or lead and selenium in cyanide copper baths; organic amines, e.g., tribenzylamine, tetraethylene pentamine; triethanolamine, etc.; hydrogen peroxide; aromatic polysulfonic acids, e.g., o-toluidine disulfonic acids; organic nitriles, e.g., as described in U.S. Pat. No. 2,524,010; carbonyl compounds, e.g., hydroxyanthraquinone or coumarin, phenols, e.g., resorcinol; and combinations of the above.

In order to achieve proper coverage of the surfaces to be plated, an extremely high ratio of activating particles to electrolyte is required as is described in more detail in the aforesaid copending application Ser. No. 102,287. Since the particles also have a density greater than that of the electrolyte it has been found that the only satisfactory means for imparting the required vibratory motion to such particles is by providing a container for the entire system and externally imposing a rapid vibratory motion to such container which in turn imparts the requisite motion to the particles by repeated impacts between the container walls and the enclosed particles. The container configuration and the motion so imparted is designed to give such particles a macro-orbit or mass rotational movement of the particles within the container and hence past the part to be plated. The macro-orbit of the particles is in a plane roughly parallel with a cross section of the container taken normal to its longer axis. The motion also imparts micro-orbits to the particles which continue as the particles move in the macro-orbit, such micro-orbits varying depending upon the point of impact on the container wall which initiates the movement and upon impacts with other particles, but generally being quite small elliptical or circular paths. The part to be plated is maintained "fixed" in the sense that it is not free to be circulated in the macro-orbit of the particles. In order to obtain the desired motion of the particles, it has now been found that the vibratory unit or container within which the particles are disposed should have at least one rounded side. The vibration causes the particles to "walk" up the rounded surface initiating the desired macro-orbiting motion. Both sides may be curved if desired. The length of the container will generally be substantially greater than either the width or depth and, in the case of a round-sided container, the unit will resemble a cylinder lying on its side with both ends closed and the top side open. The top portion of the container generally will be open over a space representing about 25% of the surface area of the container although this may vary between about 15% and 40% as desired. Preferably the unit is constructed as a single container but where the required length is unduly long as for long tubing parts or where a high volume throughput is required, then several individual units may be interconnected with flexible, liquid-tight seals linking open-ended containers to form a long open tank.

It is also necessary to provide proper electrical connections and supply means to the workpiece to be plated and to the associated anodes. Preferably the anodes are affixed to the rack or mounting means for the cathodic workpiece although they can be independently mounted within the container if desired. The anode type, configuration and arrangement will depend upon the shape of the part to be plated. Generally, however, the anodes are preferably in the form of either thin rectangular bars or plates or in the form of rods of circular or elliptical cross section so as to minimize interference with the macro-orbit of the activating particles. Because the anodes are also contacted by the activating particles, no problems of anode passivation are encountered and the process eliminates surface roughness on the electrodeposit which may occur in conventional plating through occlusion of small bits of anode material thereby eliminating need for bagging of the anodes.

It has now been found that vastly improved results are obtained if the rack or racks supporting the workpieces and electrodes are mounted independent of contact with the vibrating walls of the unit. Initial work with the various processes for which this equipment is designed was generally carried out with such rack supported by the walls of the vibrating tub which is the easiest and seemingly the most logical disposition. This type of equipment is illustrated in the copending process case, Ser. No. 102,287 mentioned above, and a similar approach is illustrated in the closest prior art (which although directed to an entirely different type of process, does utilize a crude vibratory unit with associated electrodes) U.S. Letters Pat. No. 3,523,834 to T. F. Hewins, entitled "Method of Deburring." According to the present invention the support for the electrodes must be maintained free of contact with the vibrating walls of the unit and this can be accomplished in a variety of ways as illustrated herein.

Commercial vibratory abrasive finishing machines are available and can be readily modified in accordance with the present invention. Typical of such commercial units are the Rampe Model VOF–51 "Vibrader" and the Elliott "Vibratub," Finisher Model 33.

A minimum vibrating frequency of about 500 cycles per minute must be used in order to carry out the process. Vibration rates of 1,200 to 2,200 cycles per minutes are preferred while greater rates may be used if desired. Amplitudes of vibration should range between about $\frac{1}{64}$ inch and about $\frac{1}{2}$ inch.

Plating rates will vary, depending chiefly upon the metal being plated and upon the plating solution used, but will generally run from double up to 25 times greater than the maximum rate achievable from the same system without the activating particles present. For example, using a copper sulfate plating bath with a commercial brightener "UBAC No. 1" (described in Bulletin CUP–UBAC–1 2 M, November 1967 by The Udylite Corporation, Detroit, Mich. 48234), current densities (proportional to plating rates) as much as 15 times greater than the recommended 60 amps/ft.$^2$ were used with excellent results.

In operation, the small activating particles receive the vibratory motion described above by contact with the walls of the vibratory container which motion is then transferred from the particle to particle within the container. The particles in the plating zone at any given time are both vibrating and also moving with respect to the part which is fixedly positioned in the container. It is estimated that each square inch area of the surface to be plated will be impacted repetitively about 500 to 150,000 times per second by these particles depending upon the frequency of vibration and the particle size. Essentially the particles, being of a very small size, form a complete layer over each surface to be plated but a layer which is moving laterally alone or across each surface as well as vibrating normal thereto.

Referring now to the drawings, FIG. 1 schematically illustrates in partial cross section a vibratory abrading unit modified to carry out the present process. Reference numeral 10 identifies the vibratory container or hopper mounted on dual drive shafts 11 which impart the vibration to container 10. Vibration-transmitting shafts 11 are supported on cushioned, shock-absorbing members 12 which isolate the vibrations imposed by shafts 11 (driven by suitable drive means known to the vibratory abrasive art and not illustrated herein) from the heavy, weighted base member 13. This base on a properly designed unit will be essentially vibration free. Rigidly affixed to base 13 is a support member 14 consisting of a vertical arm 15 welded or otherwise firmly affixed to the base member 13 and a cross arm 16 cantilevered from the upper end of arm 14 so as to extend across the open top 17 of container 10 at a point well above such open top. The arm 16 may obviously be formed in a single piece with arm 15 or may be supported by struts, braces, etc., as may be considered mechanically desirable. Depending from the cross arm 16 of support member 14 are one or more electrode support means here shown as two anode support means 18 each having a bar-shaped consumable anode 19 at the lower end thereof and a cathode support member 20 having a shaped workpiece 21 affixed to the lower end thereof as the cathodic workpiece. Within the container 10 and completely covering the anodes 19 and cathodic workpiece 21 is a mass of small, hard non-conductive activating particles 22. The electrolyte level (shown at rest) 23 is above the top of the activating particles 22. In operation, the container 10 is set in vibration which in turn produces vibratory motion in the mass of particles 22 and electrolyte 23. The plating current is then turned on and the vibration continued throughout the plating cycle. A centrifuge, pump, filter or the like system 24 is shown associated with the container 10 to permit recirculation, make-up and filtration of the electrolyte if desired. The electrolyte 23 is drawn off into system 24 through outlet 25 and reintroduced to container 10 through inlet 26.

Figure 2:
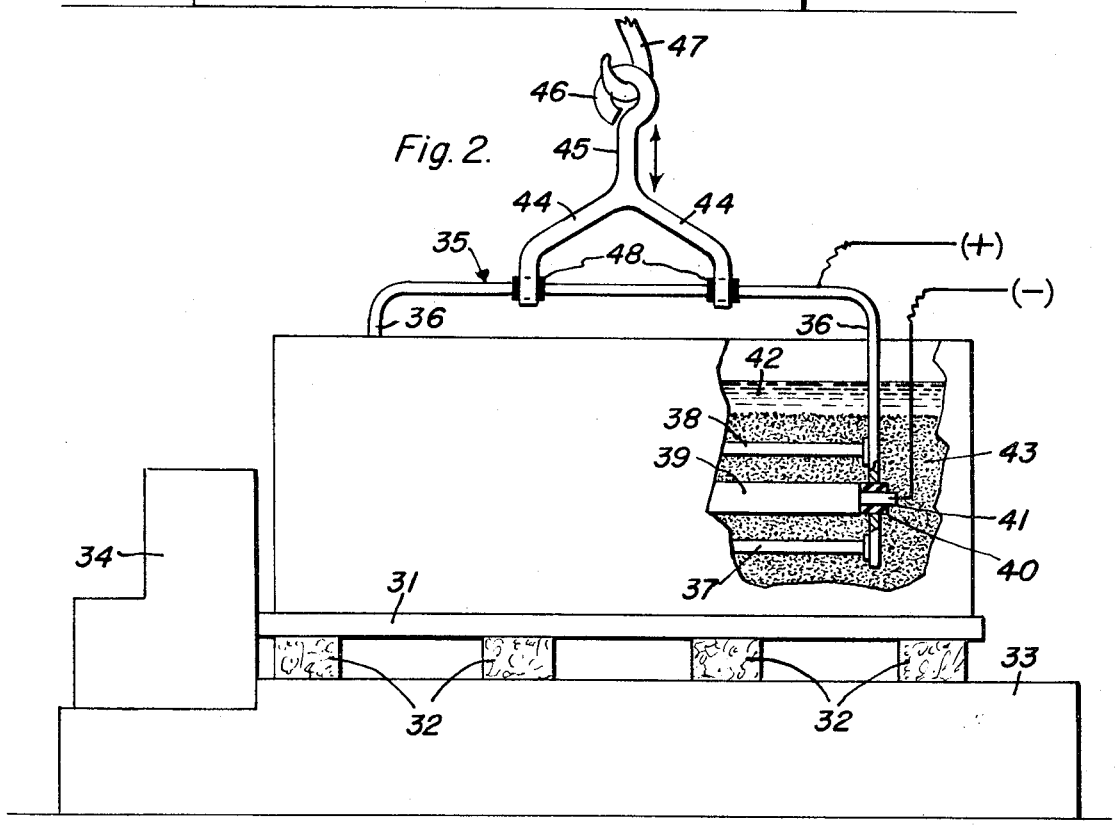
FIG. 2 is a schematic illustration of another version of the apparatus of the present invention showing an inert type of plating rack.

FIG. 2 is a schematic version of another type of apparatus set-up of the present invention showing in side view the circular cross-section plating tank or container 30 with associated vibration transmitting shaft 31 cushioned against transmitting vibration to the base member 33 by shock-absorbing members 32. Shaft 31 is driven by motor means, gears and the like in a conventional fashion and here schematically identified as 34. A suspended anodic plating rack 35 having a pair of depending arm members 36 is disposed above the container 30 so as to be capable of being lowered into the unit or removed therefrom as desired. A pair of anode rods 37, 38 are shown in the partially-cutaway section extending between rods 36 with a rod-shaped cathode 39 disposed therebetween. Cathode 39 is electrically insulated from the anode rack 35 by insulators 40 while the cathode contact 41 extends through arm 36 of rack 35 to provide contact for the workpiece 39. Again shown in the cutaway section is the electrolyte 42 and small hard particle activating mass 43. Rack 35 is lifted into or out of the tank 30 by lifting member 45 having a pair of engaging arms 44 and a ring member 46 adapted to be engaged by a suitable lifting hook 47. Engaging arms 44 are electrically insulated from the anode rack 35 by insulators 48.

FIG. 3 illustrates a longer line adapted to handle multiple racked parts. Here, two vibratory hoppers 50 and 51 are linked by a flexible connector 52 made of suitable synthetic plastic. These hoppers are supported on base members 53 and 54 respectively with vibration imposing shafts 55 and 56 isolated from transmitting vibration to base members 53 and 54 through shock absorber members 57. Shafts 55 and 56 are driven by conventional gear and motor drives as known to the art and schematically represented at 58 and 59 respectively. An overhead ceiling support channel 60 is provided for the suspension of a conveyor system for carrying parts to be plated through the plating tanks or vibratory containers 50 and 51. Illustrated diagrammatically, the conveyor system comprises a moving chain 61 passing through a shaped channel member 62 so disposed as to dip down toward the plating tanks 50–51 as it approaches such tanks and to rise as it leaves tank 51. This shaped channel 62 is suspended by suitable hangers 63 from ceiling channel 60. Depending from the moving chain 61 are a plurality of racks 64, each carrying a plurality of anodes 65 and a cathode (which is the part to be plated) 66. Suitable electrical connections (not shown) lead from the anodic rack and the cathodic part in conventional manner. As the rack 64 approaches the in-feed end of tank 50, it drops down until the anodes and cathode are submerged in the mixture of small hard particles and electrolyte in tank 50. With the high density of particles employed, the unit should be in vibration before the first loaded rack approaches the point of entry. Parenthetically, this is true in the case of the previous versions of the equipment illustrated herein. With the unit in vibration the parts or racks will rapidly work their way down into the vibrating mass with very little, if any, applied force being necessary. The rack 64, submerged in the vibrating mass is moved by chain 61 through the plating zone which is here shown as consisting of two interconnected tanks. Obviously, more such tanks can be interconnected with offset arrangements for the drive motors if a longer zone is desired. At the end of the plating zone (here, the end of tank 51), the rack 64 is elevated by the configuration of the shaped channel member 62 in which chain 61 tracks and is raised high enough to clear the end of tank 51 whereupon it passes on to a further set of tanks for additional plating or for washing or other treatments as desired prior to having the cathodic workpiece removed. Obviously, multiple cathodic workpieces can be fixtured to a single rack and generally will be in commercial practice.

What is claimed is:

1. Electrodeposition apparatus comprising in combination:
    (a) a container having in cross section at least one rounded side;
    (b) means to apply vibration to the walls of said container whereby, when a mass of loose particles and electrolyte is contained therein, a mass rotational movement will be imposed upon such particle-electrolyte mass;
    (c) means to position at least one set of electrodes within said container, said positioning means being free of any contact with any vibrating portion of said container; and
    (d) means to impose a voltage differential between said electrodes to initiate and maintain an electrodeposition current flow therebetween.

2. Apparatus as in claim 1 wherein said means to position said electrodes comprises a vertical member affixed to a stationary base and an arm extending horizontally from said vertical member as a support means for said electrodes.

3. Apparatus as in claim 1 wherein said means to position said electrodes comprises an overhead conveyor free of contact with said container and means depending from said conveyor to support said electrodes.

4. Apparatus as in claim 1 wherein said container is made up of a multiplicity of containers joined by connectors to provide a long continuous open tank.

5. Apparatus as in claim 1 wherein said container has a circular cross section with approximately 25% of the upper portion thereof removed to provide a curved tub open at the top and closed at both ends.

References Cited
FOREIGN PATENTS
3,523,834  8/1970  Hewins _____ 204—273

JOHN H. MACK, Primary Examiner
W. I. SOLOMON, Assistant Examiner

U.S. Cl. X.R.
204—35 R, 36, 261, 273, DIG. 10